(12) United States Patent
Whetton et al.

(10) Patent No.: US 9,417,354 B2
(45) Date of Patent: Aug. 16, 2016

(54) LOG INVERSION METHOD FOR NUCLEAR LOG DATA OF EARTH FORMATIONS

(71) Applicant: Reeves Wireline Technologies Limited, Leicestershire (GB)

(72) Inventors: James Anthony Whetton, Nottingham (GB); Peter Adrian Spencer Elkington, Loughborough (GB)

(73) Assignee: Reeves Wireline Technologies Limited, Leicestershire (GB)

( * ) Notice: Subject to any disclaimer, the term of this patent is extended or adjusted under 35 U.S.C. 154(b) by 507 days.

(21) Appl. No.: 13/759,902

(22) Filed: Feb. 5, 2013

(65) Prior Publication Data

US 2013/0253835 A1   Sep. 26, 2013

(30) Foreign Application Priority Data

Mar. 23, 2012   (GB) .................................. 1205171.0

(51) Int. Cl.
*G01V 5/04*  (2006.01)
*G01V 5/06*  (2006.01)

(52) U.S. Cl.
CPC  *G01V 5/045* (2013.01); *G01V 5/04* (2013.01); *G01V 5/06* (2013.01)

(58) Field of Classification Search
CPC ........... G01V 5/045; G01V 5/04; G01V 5/06; G01V 5/00
See application file for complete search history.

(56) References Cited

U.S. PATENT DOCUMENTS

| | | | |
|---|---|---|---|
| 5,461,562 A | 10/1995 | Tabanou et al. | |
| 5,581,024 A | 12/1996 | Meyer, Jr. et al. | |
| 5,619,411 A | 4/1997 | Smith | |
| 6,253,155 B1 | 6/2001 | Hagiwara | |
| 6,366,088 B1* | 4/2002 | Hagiwara | ..................... 324/303 |
| 7,679,050 B2 | 3/2010 | Samworth | |
| 7,700,910 B2 | 4/2010 | Samworth | |

FOREIGN PATENT DOCUMENTS

| | | |
|---|---|---|
| GB | 2464270 | 4/2010 |
| WO | 2004095072 | 11/2004 |
| WO | 2011127281 | 10/2011 |

OTHER PUBLICATIONS

Barber et al., Real-Time Openhole Evaluation, Summer 1999, Oilfield Review, pp. 36-57.*

(Continued)

*Primary Examiner* — Toan Le
(74) *Attorney, Agent, or Firm* — Blank Rome LLP (57) ABSTRACT

Inverting nuclear log data for a geological formation surrounding a borehole involves acquiring nuclear log data for a borehole portion using a moveable nuclear logging tool and acquiring additional log data for the borehole portion using another logging device with superior resolution. Boundaries between adjacent zones are identified that exhibit an attribute of the geological formation to a detectably contrasting degree. From pre-acquired data describing one or more characteristics of the nuclear logging tool, a modeled log of the attributes is generated over the borehole portion, and a zone response is calculated from the pre-acquired data for each zone by using the boundaries to define an initial measure of the depth of each zone and ascribing a value of the attribute in dependence on the depth of each zone. The attribute of each zone is then calculated by deconvolving the nuclear log data using the zone response to minimize the difference between the nuclear log data and the convolution of the zone response and the attribute.

18 Claims, 5 Drawing Sheets

(56) References Cited

OTHER PUBLICATIONS

Mendoza et al., Linear Iterative Refinement Method for the Rapid Simulation of Borehole Nuclear Measurements: Part I—Vertical Wells, Jan.-Feb. 2010, Geophysics, vol. 75, No. 1, pp. E9-E29.*

Examination Report received in Great Britain Application No. GB1205171.0 dated Jul. 17, 2012, 5 pages.

Patent Examination Report No. 1 received in corresponding Australian application No. 2013200951, dated Sep. 27, 2013.

* cited by examiner

Figure 1

——— EARTH MODEL
-------- MCNP MODELLED LOG RESPONSE
——— INVERTED RESPONSE, BED THICKNESS + 2 SAMPLES
—·—·— INVERTED RESPONSE, BED THICKNESS − 2 SAMPLES

LOG INVERSION METHOD FOR NUCLEAR LOG DATA OF EARTH FORMATIONS

CROSS-REFERENCE TO RELATED APPLICATIONS

This application claims priority under 35 U.S.C. §119(a) to U.K. Appl. No. GB 1205171.0, filed 23 Mar. 2012.

FIELD OF THE DISCLOSURE

The invention relates to the field of log inversion and to a sub-set of the group of techniques available to geoscientists having responsibility for identifying with accuracy the locations of fields of hydrocarbons and other valuable minerals in subterranean formations.

BACKGROUND

The logging of geological formations is, as is well known, economically an extremely important activity.

Virtually all commodities used by mankind are either farmed on the one hand or are mined or otherwise extracted from the ground on the other, with the extraction of materials from the ground providing by far the greater proportion of the goods used by humans.

It is extremely important for an entity wishing to extract materials from beneath the ground to have as good an understanding as possible of the conditions prevailing in a region from which extraction is to take place.

This is desirable partly so that an assessment can be made of the quantity and quality, and hence the value, of the materials in question; and also because it is important to know whether the extraction of such materials is likely to be problematic.

The acquisition of such data typically makes use of techniques of logging. Logging techniques are employed throughout the mining industry, and also in particular in the oil and gas industries.

In the logging of oil and gas fields, specific problems can arise. Broadly stated this is because it is necessary to consider a geological formation that typically is porous and that contains a hydrocarbon-containing fluid such as oil or gas or (commonly) a mixture of fluids only one component of which is of commercial value.

This leads to various complications associated with determining physical and chemical attributes of the oil or gas field in question. In consequence, a wide variety of logging methods has been developed over the years. The logging techniques exploit physical and chemical properties of a formation usually through the use of a logging tool or sonde that is lowered into a borehole formed in the formation by drilling.

It is commonplace in the mining and oil/gas industries to refer to the elongate dimension of the borehole as its "depth"; and to talk of the logging tool as being moveable "vertically" in the borehole. This is true even in the case of boreholes that do not extend directly vertically into the ground or indeed are substantially horizontal, or extend in complicated paths only parts of which are vertical. Such terminology is used herein and is not to be construed as limiting.

Typically, the tool sends energy into the formation and detects the energy returned to it that has been altered in some way by the formation. The nature of any such alteration can be processed into electrical signals that are then used to generate logs (i.e. graphical or tabular representations containing much data about the formation in question). A log can be considered as the result of a mathematical convolution of (a) the geological data along the formation penetrated by the well-bore with (b) the spatial response function of the well-logging tool.

One known aspect of log processing is known as inversion. In this technique, certain data that may pertain—e.g., to a log or to measured characteristics of a logging tool—are used to improve the spatial, and especially the vertical, response characteristics of a logging tool used to produce another log. Generally, as indicated, log inversion in the past has been applied commonly to electrical (resistivity/conductivity) logging.

Broadly speaking, the vertical response function (vrf) of a logging measurement represents its sensitivity to an attribute or property of a geological formation over a certain distance corresponding to the resolution of the tool. The vrf may be represented as a plot of weighting factors such that the measurement at any depth may be generated from the product of the factors and the attribute or property of a formation. It is known to pre-compute vrf plots for a given logging tool design consisting of the output curves of the tool in a range of rock types that exhibit a range of values of the property the tool is intended to measure. Log analysts use the vrf plots to assist in the interpretation of log data since they indicate the accuracy with which the tool can be expected to identify specific features in a particular type of formation.

More specifically, depending on the tool design and the character of the formation the tool resolution may range from a relatively small distance to several tens of centimeters. The response function of a tool has the effect of "smearing" the measurements in accordance with the weighting factors mentioned, such that it is only possible to resolve features in the formation that extend for a greater distance along the borehole than the aforesaid tool resolution. Features the depths of which are less than the tool resolution cannot readily be distinguished owing to the data smearing effect of the response function.

As a result of the vertical response function therefore a feature that extends over a relatively short part of the borehole depth, being less than the tool resolution, and that exhibits a measured characteristic relatively strongly may produce a closely similar log measurement to another feature that extends for a greater distance along the depth of the borehole nonetheless also less than the tool resolution and that exhibits the measured characteristic less strongly. In consequence, it is impossible to a good level of accuracy to determine from study of the log whether the feature is a relatively short one that exhibits the characteristic somewhat intensely, or is a feature extending over more of the depth of the borehole while exhibiting the characteristic less concentratedly over its depth.

The main aim of inversion is to process acquired log data in an attempt to eliminate this data smearing effect and thereby permit a log analyst to discriminate between two or more features that otherwise would be indistinct owing to the vertical response function.

The problems deriving from poor tool resolution pertain in the case of nuclear logs in which the tool is capable of resolving only to an accuracy of, depending on the exact tool design, about 0.6-m. This means that geological features of a depth of less than 0.6-m potentially may be wrongly identified or categorized, or may not even be detected at all.

This is an especially acute difficulty when prospecting for e.g. coal bed methane or shale gas. The formations in which such commodities are found typically are heavily stratified, with distinct beds (also referred to herein as zones or layers) often being only a few centimeters deep. Clearly in such cases, the existing nuclear logging techniques may be largely unsuited to the correct identification of hydrocarbon-bearing strata.

Moreover, the techniques of inversion that are known in relation to resistivity logging for one reason and another are computationally complex. Aside from the fact that they do not readily transpose to the nuclear logging environment, the complexity of the resistivity inversion algorithms means that, depending on the speed of the logging tool in the borehole, they cannot be performed in real time.

On the contrary, it is commonly necessary to acquire resistivity data and subsequently invert it; and this means that the prior art techniques of inversion are not generally useable when it is required to carry out so-called "logging while drilling" (LWD) and "geosteering" operations, the nature of which will be known to the worker of skill in the art.

SUMMARY OF THE DISCLOSURE

The invention aims to solve or at least ameliorate one or more disadvantages of the prior art. To this end, in accordance with a broad aspect of the invention, a method of inverting nuclear log data pertaining to a geological formation surrounding a borehole comprises the steps of: (a) acquiring nuclear log data in respect of at least part of the depth of the borehole using a moveable nuclear logging tool; (b) acquiring further log data, in respect of the said part of the depth of the borehole, using a further logging device the depth resolution of which is superior to that of the nuclear logging tool; (c) identifying from the further log data a plurality of boundaries between adjacent zones of the said part of the depth that exhibit an attribute of the geological formation to a detectably contrasting degree; (d) generating from pre-acquired data describing one or more characteristics of the nuclear logging tool a modeled log of the attribute over the said part of the depth; (e) calculating from the pre-acquired data the zone response in respect of each said zone, using the boundaries to define an initial measure of the depth of each zone and ascribing a value of the said attribute in dependence on the said depth of each zone; and (f) calculating the attribute of each zone by deconvolving the log data using the zone response so as to minimize the difference between the log data and the convolution of zone response and zone attribute.

Using a log of superior resolution to constrain the physical limits of adjacent, distinct features of a nuclear log of lesser resolution permits the modeling of a log showing dramatic improvements in resolution compared with prior art nuclear logs.

As used herein the term "zone response" refers to a function generated by convolution of a top hat function representing the zone, layer or bed (see below) with the tool vertical response function and that, in respect of a particular zone (or layer, or bed) of the formation is arranged to be a constant value applied over the depth of the zone. In this sense the method of the invention may be referred to as "constrained inversion"—in other words it relates to an inversion technique in which the zone response that is constrained to be a constant value over the zone depth is used as a key term in the inversion algorithm. This provides a high quality estimate of the zone attributes compared with prior art inversion techniques in which a separate response value is calculated in respect of each individual sampling point in the log. Moreover the robustness of the inversion performed using the method of the invention has been found to be very good.

The use of boundary data from the higher-resolution log is as stated computationally straightforward to achieve, with the result that a relatively simple algorithm (explained in more detail below) may be used to generate the inverted log. This in turn means that the method of the invention may be carried out in "real time" thereby rendering it highly suitable when carrying out LWD and geosteering operations.

The processing simplicity of the method derives in part from the fact that as summarized above the use of accurate bed boundary data from a high-resolution log such as an image log as described below avoids the use, in the prior art, of multiple vrf plots as part of the inversion process to achieve the same level of accuracy.

Put another way, accurate bed thickness information obtained from high resolution logs such as image logs contributes strongly to the stability and accuracy of the inverted result so that only a single vrf is required to achieve the desired accuracy leading to the indicated speed and simplicity improvements.

The method may be carried out either by a suitably programmed processing device located at a surface location and to which real time log data may be telemetered; or, in part because of its simplicity, using an on-board processing device carried by the logging tool or an associated drilling tool.

The method may however also be carried out on saved data at a time separated from the logging activity.

Preferably, the method includes one or more further steps selected from the list consisting of: (g) transmitting, outputting, processing, printing, saving and/or displaying the inverted log.

It is also preferable that the nuclear logging tool is or includes a density logging tool, a gamma logging tool or a neutron porosity logging tool, and the nuclear log data correspond to the tool type. Use of the inversion method of the invention in respect of log data from all such tool types is believed to produce resolution improvements as outlined above.

Conveniently, the further logging device is an image logging tool, especially a micro-resistivity imaging tool; and the further log data is an image log of the said part of the depth of the borehole. In preferred embodiments of the invention, the adjacent zones of the said part of the depth of the borehole are or correspond to adjacent beds of the geological formation.

Image tools advantageously produce with fine resolutions image-type formation logs in which beds and other strata may readily be distinguished from one another. Moreover, the use in accordance with the invention of logs produced by such tools have been found to produce sufficiently good improvements in nuclear log resolution that it is not necessary to consider other refinements that form parts of prior art inversion techniques. This further minimizes the amount of calculation needed to carry out the method of the invention, thereby additionally improving its suitability as a real-time technique.

Preferably, the aforesaid attribute of the geological formation is selected from the group consisting of the density, neutron porosity and natural gamma radiation of the said formation. The method of the invention may additionally be useable in respect of other attributes, but the foregoing list is presently regarded as containing the most likely applications.

Further conveniently, the step of calculating from the pre-acquired data the zone response in respect of each said zone, using the boundaries to define an initial measure of the depth of each zone and ascribing a value of the said attribute in dependence on the said depth of each zone, includes calculating the zone response in accordance with the expression $$br_k = \sum_{m=sd-fl}^{ed+fl} W_k(m) \cdot vrf(n-m)$$

in which:

$br_k$ is the zone response;

k is the zone number in a depth window;

$W_k$ is a top hat function specific to the depth of the zone in question;

vrf is the tool vertical response function;

fl is a number of samples in the vertical response function;

sd is the start depth within a depth window;

ed is the end depth within a depth window;

n represents the formation depth in the window; and m is the summation index.

Some preferred embodiments of the invention as described employ one vrf to represent one characteristic of a logging tool, but in other embodiments falling within the scope of the invention as claimed multiple vrf's may, depending on the logging measurement, be advantageous notwithstanding that the most important attribute is the position of the zone boundaries. Therefore, preferably the one or more characteristics of the nuclear logging tool include one, or more, vertical response function characteristics.

Conveniently, the pre-acquired data are Monte Carlo N-Particle Transport Code (MCNP) modeled data acquired by the further step of, before acquiring the nuclear log data, operating the nuclear logging tool or another logging tool having the same characteristics as the nuclear logging tool in a test environment having known attributes; and processing the responses of the thus-operated logging tool in accordance with an MCNP method. Such data may be acquired for example by calibrating the logging tool using standard rock simulators such as the Callisto facility in East Leake, UK, details of which are available at www.callisto-calibration.co.uk.

In one embodiment of the method of the invention, the step of identifying from the further log data a plurality of boundaries between adjacent zones of the said part of the depth includes the sub-steps of (c1) viewing the further log via an electronic viewing device having an input device that is capable of selecting one or more parts of the log for combination with the nuclear log; and (c2) selecting one or more parts of the further log corresponding to the said boundaries using the input device. In this way, the method advantageously lends itself to the selection of bed boundaries using an input device such as a computer mouse to select successive bed boundaries in an image log of the kind described above. Such an approach is simple and reliable.

In an alternative embodiment, however, the boundary selection process may be automated and to this end optionally the step of identifying from the further log data a plurality of boundaries between adjacent zones of the said part of the depth may include the sub-step of (c3) operating software that is capable of identifying the said boundaries in order to select one or more parts of the further log corresponding to the said boundaries.

Suitable software may be for example an edge recognition program that locates successive boundaries. The use of such software assists in making the method sufficiently quick to complete that it is suitable for real-time processing of log data should this be desired.

Regardless of the preferred boundary selection method, preferably the steps of (a) acquiring nuclear log data in respect of at least part of the depth of the borehole using a moveable nuclear logging tool and (b) acquiring further log data, in respect of the said part of the depth of the borehole, using a further logging device the depth resolution of which is superior to that of the nuclear logging tool are carried out in a single logging pass along the said part of the depth of the borehole.

This aspect of the invention further speeds up completion of the method such that it is suitable for real-time operations as explained. For the avoidance of doubt, the nuclear and further logging tools may be autonomous tools or wireline tools the nature of which will be familiar to those of skill in the art.

In order to support the ability of the nuclear log data and further log data acquisition steps to be carried out in a single logging pass, preferably the nuclear logging tool and the further logging device are secured to or are formed integrally with one another.

Furthermore for the avoidance of doubt, the invention includes within its scope a method as defined herein the steps of which are carried out in real-time relative to the acquisition of the nuclear log data and the further log data. More specifically, the method of the invention optionally may be carried out as part of a logging while drilling (LWD) operation.

Additionally or alternatively, the method may include the further, optional step of (h) using the inverted log to generate one or more command inputs to a geosteering apparatus for controlling the direction of drilling of a controllable drilling tool.

The invention additionally resides in an inverted log generated in accordance with a method as defined herein.

The invention is of benefit in logging activities potentially in all kinds of mining and especially in the logging of reserves of oil and gas.

BRIEF DESCRIPTION OF THE DRAWINGS

There now follows a description of preferred embodiments of the invention, with reference being made to the accompanying drawings in which.

DETAILED DESCRIPTION

Figure 5A:
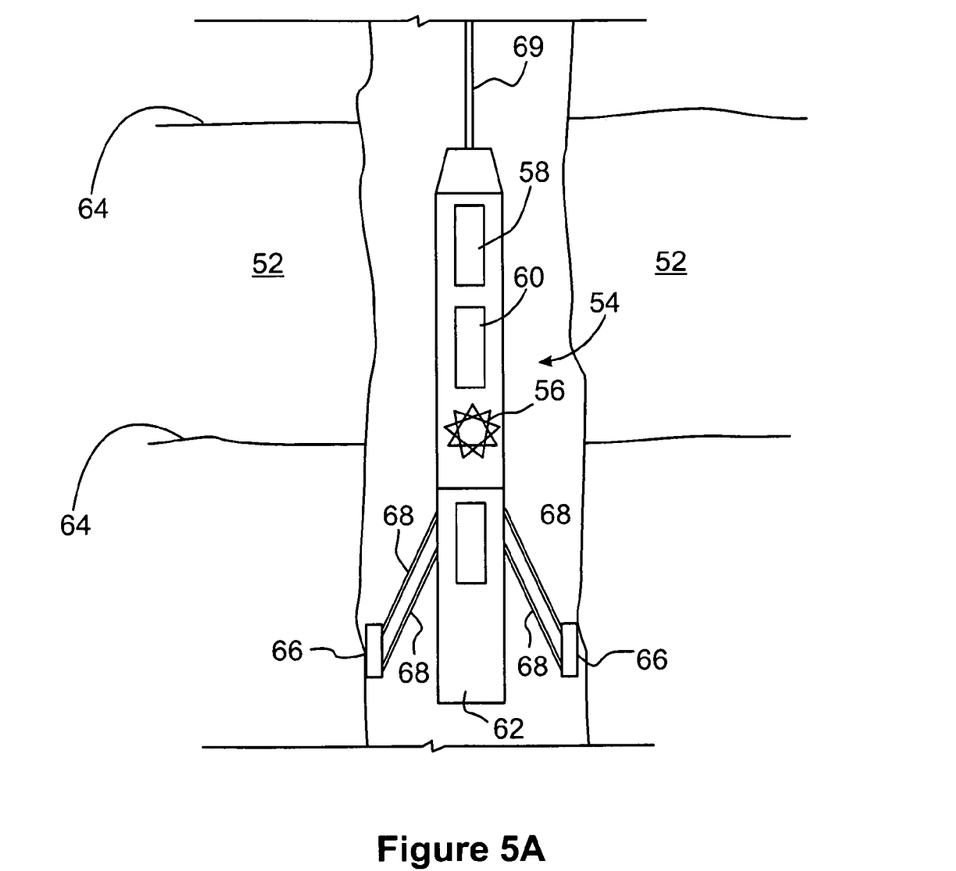
FIG. 5A is a schematic drawing showing the basic features of a logging tool.
Figure 5B:
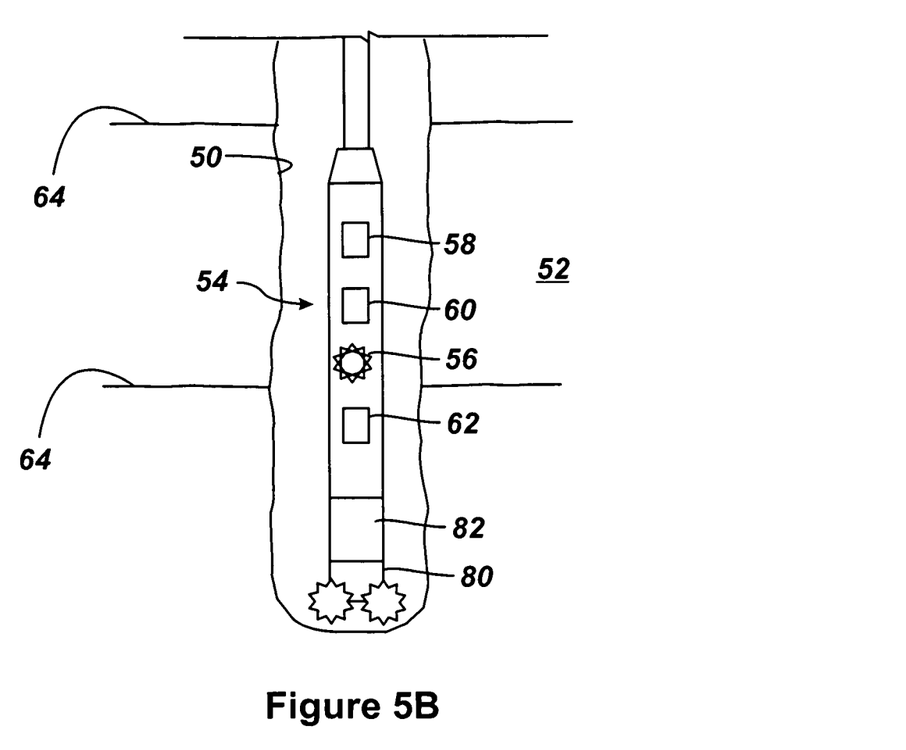
FIG. 5B is a schematic drawing showing a controllable drilling tool with a geosteering apparatus.

As is well known, a nuclear logging tool includes one or more detectors of natural radiation, or a radiation source that is used to irradiate a formation surrounding a borehole, and two or more detectors of returned radiation. For example, FIGS. 5A-5B show a nuclear logging tool 54 containing a radiation source 56 used to irradiate a formation 52 surrounding a borehole 50 and containing two or more detectors 58 and 60 of returned radiation. These principal parts of the tool 54 are housed in an elongate, rigid cylinder having windows at appropriate locations to permit the emission and return of radiation as appropriate.

In the case of tools that include a radiation source 56, radiation received at each detector 58 and 60 is combined so as to minimize the effect of mudcake and/or other non-standard borehole conditions. This makes it convenient to consider a single vertical response function notwithstanding the use of two radiation detectors 58 and 60 as indicated.

Figure 1:
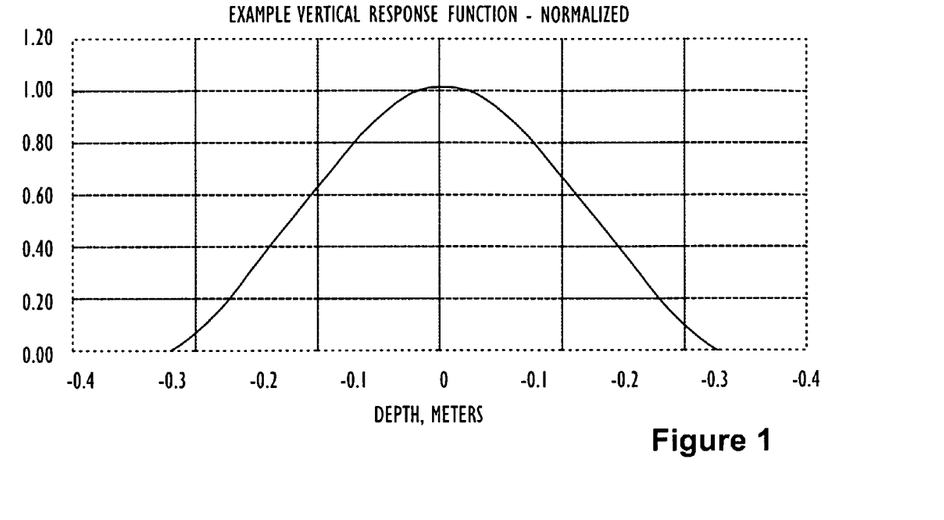
FIG. 1 is a plot showing a typical, composite vertical response function of a density logging tool.

FIG. 1 illustrates an exemplary, non-limiting logging tool vertical response function (vrf), and highlights the effect of the vrf of a tool in smearing data recorded (logged) at a specific, single depth (labeled as a depth of 0 in the figure) over a considerable distance.

In the example of FIG. 1, the data is smeared over an overall depth of 0.6-m (i.e., 0.3-m to either side of the sampling point at depth 0).

As indicated, the vrf of FIG. 1 in practice is obtained in a two-detector tool 54 (as depicted in FIG. 5, for example) having two longitudinally spaced radiation detectors 58 and 60, the outputs of which are combined using software, examples of which will be known to the worker of skill. For the purposes of explaining the method of the invention, however, the vrf may be considered as the single plot illustrated.

Figure 2:
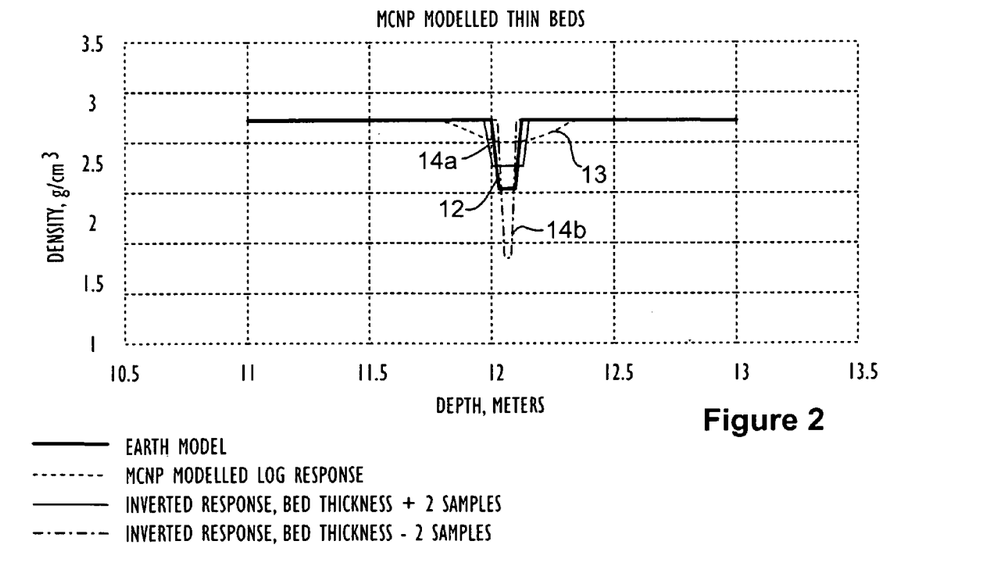
FIG. 2 is a plot illustrating the types of density value error that can arise through inaccurate bed boundary positioning in an inversion method.

FIG. 2 shows the effect of attempting to invert density data on the basis of inaccurate boundary position data. In FIG. 2, an inverted true bed thickness log 12 (solid black line), pertaining to an isolated thin layer of the kind discussed above with reference to the vrf, may be compared with a modeled log response 13 (dotted black line) created using an MCNP model.

Dark grey log response line 14a represents an inaccuracy, in the inversion calculation, of using a bed whose thickness is two depth samples more than the true bed thickness. Light grey inverted log response line 14b shows the effect of a bed whose thickness is two depth samples less than the true bed thickness. The two grey line inverted log responses in FIG. 2 show considerable magnitude deviations from the true log response 12.

FIG. 2 in other words shows that in relation to nuclear logs it is essential to locate the bed boundaries (e.g., 64 in FIG. 5) with considerable accuracy in order to achieve useful inversion of the log data. The inventors have found that using an image log, especially a micro-resistivity image log having a depth resolution of approximately 2-mm, represents one highly effective way of achieving this aim.

An aspect of the method of the invention therefore lies in the realization that accurate bed boundary determination gives rise to highly accurate, robust inverted logs. To that end, the tool 54 of FIGS. 5A-5B includes an additional logging device 62 that acquires additional log data of the borehole. The depth resolution of the logging device 62 is superior to that of the nuclear logging tool 54.

As shown in FIGS. 5A-5B, the nuclear logging tool 54 and the additional logging device 62 can be secured to or formed integrally with one another. The additional logging device 62 can be an image logging tool so that the additional log data can be an image log of the borehole. One example of such an image logging tool is a micro-resistivity imaging tool as schematically illustrated in FIG. 5A. This is supported in a logging toolstring element that, as schematically illustrated in FIG. 5A, may be added to the toolstring. Another example of a high resolution logging tool that is suitable to form part of the invention is a high resolution resistivity sensor in a nuclear logging tool forming part of a logging while drilling (LWD) assembly, as shown in FIG. 5B.

FIG. 5A schematically shows the features of a typical image logging tool including a plurality of pads 66 supporting electrically conducting buttons that energize the formation with electrical energy and/or detect returned energy. The pads 66 are deployed on extensible arms 68 that press the pads 66 into contact with the borehole around the tool 62. As is well known in the logging tool art, such an arrangement can give rise to high resolution images that are of utility in the method of the invention. The high resolution logging tool, however, may take other forms than the one illustrated.

FIG. 5A also shows in schematic form a wireline 69 on which the illustrated logging toolstring is deployed and that conveys data from the toolstring to a surface location (not shown). The nature and operation of wireline are known per se.

As noted herein, the logging toolstring instead may be autonomous in the sense of being self-powered. In such a case, the wireline 69 would be dispensed with, and instead the toolstring would be conveyed to its deployed location using any of a variety of techniques that are known in the art. Such an autonomous toolstring can record log data before being retrieved to a surface location, at which downloading of the data would occur.

In one example, FIG. 5B is a schematic drawing showing a controllable drilling tool 80, which can benefit from the techniques of the present invention. In particular, an inverted log generated by the techniques disclosed herein can generate one or more command inputs to a geosteering apparatus 82 for controlling the direction of drilling of the controllable drilling tool 80.

The inventors have developed a highly effective inversion method that relies on the aforesaid realization, and is described in the following section:

Inversion Detail

A log $\rho_l$ is the convolution of a formation property $\rho_f$ with the measurement vertical response function (vrf):

$$\rho_l = (\rho_f * vrf)(n) \stackrel{def}{=} \sum_{m=sd-fl}^{ed+fl} (\rho_f(n) \cdot vrf(n-m))$$

In principle, it is possible to invert the equation with a classical deconvolution in which the formation property is computed for each depth sample. As noted, however, this approach leads to drawbacks. In the method of the invention, therefore, it is assumed that the formation property is constant within a layer (bed).

The method involves first calculating the response of the measurement to each bed. This is termed the bed response (br). This is done by convolving a top hat function (W, marking the bed position) with the vertical response function $$br_k = \sum_{m=sd-fl}^{ed+fl} W_k(m) \cdot vrf(n-m)$$

Where:
k is bed number in a depth window;
vrf=vertical response function;
TD=total depth;
vrf is reflected about $\tau=0$;
fl=number of samples in the vrf;
sd=start depth within a depth window;
ed=end depth within a depth window;

x=depth;
$\rho_f$=formation property;
$\rho_l$=log value;
n=depth in window/sampling rate; and.
m=summation index
Log density is the convolution of the bed response and bed density values:

$$\rho_{l_1,n} = br_{n,k} * \rho_{f_1,k}$$

Deconvolution of $\rho_l$ followed by a least squares minimization provides the value of $\rho_f$ for each bed:

$$\rho_{f_k} = \text{deconv}(\rho_{l_n}, br_{n,k})$$

Where deconv is the deconvolution function, and $\|\rho_{l_n} - br_{n,k} * \rho_{f_k}\|_2$ is minimized.

It has not been found necessary to constrain the range of bed density values.

Figure 3:
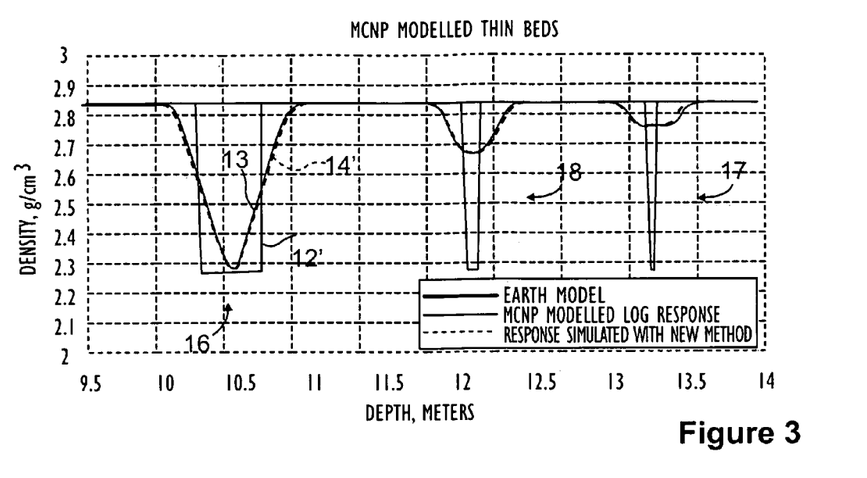
FIG. 3 is a plot illustrating the principle of the inversion method of the invention.

FIG. 3 illustrates the benefit of the method as specified herein, and in particular shows the advantage of employing accurate bed boundary data. In FIG. 3, the modeled data 12' (solid black line) differ from those in FIG. 2 by reason of showing the tool responses to a range of geological feature thicknesses (depths). The inverted data 14' (dotted black line) resulting from carrying out of the method steps defined herein track very closely the simulated data 13 (solid grey lines) with which the steps of the method of the invention seek convergence, thereby indicating that the inversion takes place with very considerable accuracy.

FIG. 3, therefore, demonstrates the importance of using highly resolved bed boundary data to achieve inversion. The inversion, however, is possible using only a single vrf value for each bed (or using e.g. a small, plural number of vrf values, as postulated herein), with the result that the calculation of the method takes place very quickly and thereby permits processing of log data in real time, while retaining the aforesaid accuracy.

FIG. 3 also illustrates the tolerance of the method of the invention to variations in bed thickness, with the inverted log response 14' accurately tracking the MCNP modeled log response 13 regardless of whether one considers a relatively thick bed 16, a relatively thin bed 17 or a bed 18 of intermediate thickness.

(In the example of FIG. 3 the three beds 16, 17, 18 are shown as having the same properties, but in a real-life situation, this would be unlikely to be the case.)

Figure 4:
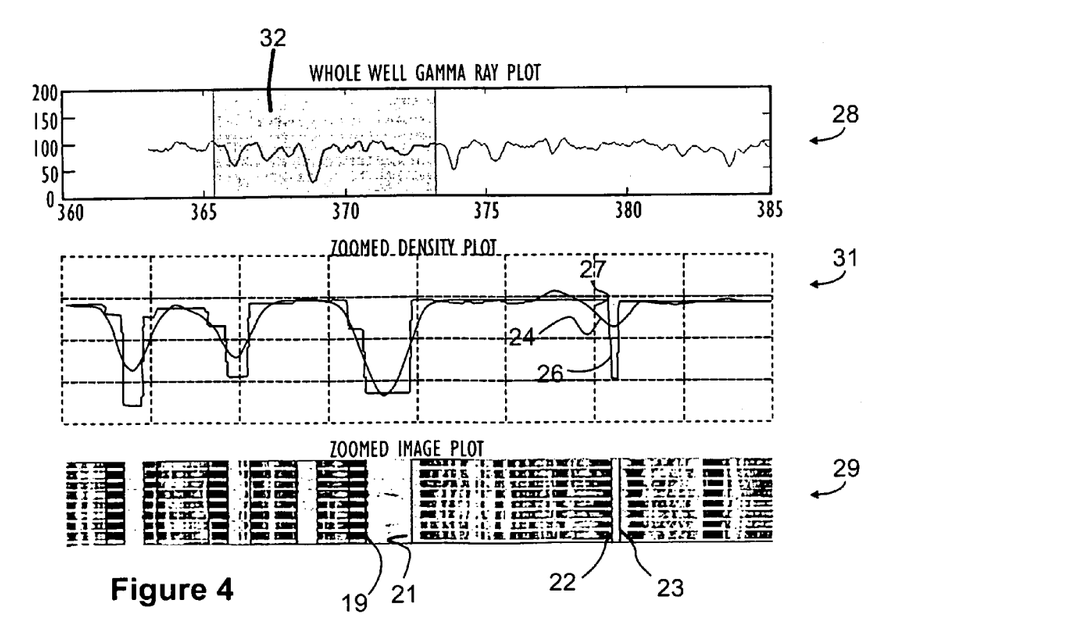
FIG. 4 includes a nuclear log on which the steps of the method have been carried out using an image log that is also shown in FIG. 4 (but that could be recorded separately and stored remotely)

FIG. 4 shows the results of actual log data processed in accordance with the invention.

The bed boundaries (examples of which are labeled as 19 and 21 (thick bed) and 22 and 23 (thin bed) in FIG. 4) are represented by the straight lines traversing the middle and lower tracks of the image logs printed below modeled, true and inverted (in accordance with the method of the invention) logs 24, 26, 27. The technique of the invention involves either using an edge recognition program to identify the locations of the boundaries, and using this data in an inversion method as specified broadly herein to constrain the density log data; or individually selecting the boundaries e.g. by using on-screen mouse clicks to log their positions before the algorithm of the method is run. Obviously, the use of an edge recognition program is likely to produce results more quickly than the on-screen technique using an input device such as a mouse or keyboard.

Figure 6:
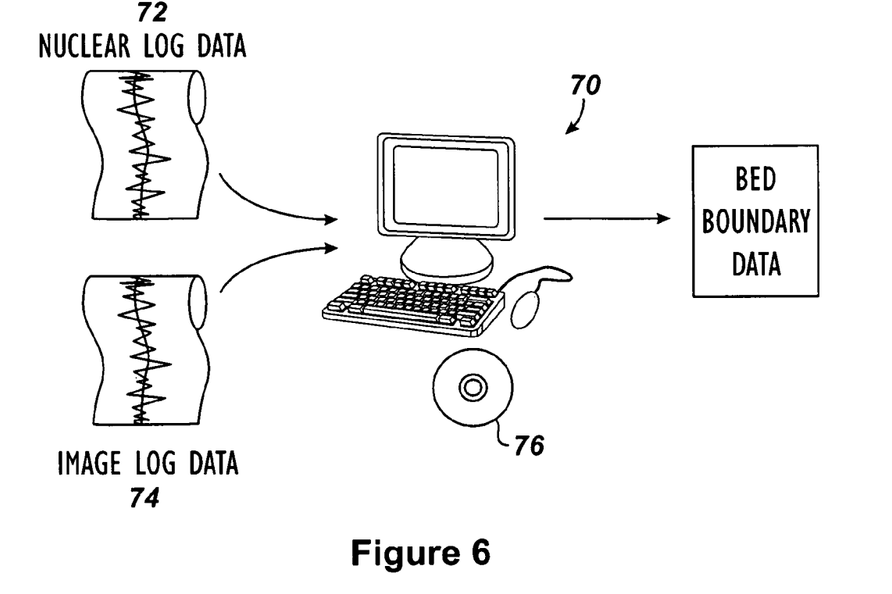
FIG. 6 is a schematic drawing showing an electronic viewing device for processing image log data and nuclear log data according to the present invention.

For example, to identify from the image log data the plurality of boundaries between the adjacent zones of the borehole, FIG. 6 shows an electronic viewing device 70, such as a computer, that is used for viewing the image log data 74. The electronic viewing device 70 has an input device, such as mouse, keyboard, etc., that is capable of selecting one or more parts of the image log data 74 for combination with the nuclear log data 72. Therefore, one or more parts of the image log data 74 corresponding to the boundaries is selected using the input device of the viewing device 70. Identifying from the image log data 74 the plurality of boundaries between the adjacent zones of the borehole can also involve operating software 76 that is capable of identifying the boundaries in order to select one or more parts of the image log data corresponding to the boundaries.

Regardless of the precise method of acquiring the bed boundary data, these in respect of each bed are in accordance with the method of the invention input as parameters to define the top hat function W mentioned above. It then is possible to perform the inversion over the bed depth using the technique described above.

In FIG. 4, the shaded interval 32 of uppermost track 28 plots the gamma response over the depth of the borehole that was investigated whereas the lowermost track 29 and the center track 31 each represent an enlarged section for purposes of illustrating the advantages and effects of the invention. The difference in scale between the track 28 on the one hand and tracks 29 and 31 on the other is made clear by the depth measurement scale figures at the foot of track 28 and the foot of track 31 respectively.

Overall, the use of the method, including the employment of accurate bed boundary data acquired using relatively high-resolution logging equipment, results in very significant improvements in nuclear log resolution that until now have not been available. Moreover, the method of the invention permits the real-time inversion of nuclear log data.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method of generating an inverted nuclear log pertaining to a geological formation surrounding a borehole, the method comprising the steps of:
   (a) acquiring nuclear log data in respect of at least part of the depth of the borehole using a moveable nuclear logging tool;
   (b) acquiring further log data, in respect of the said part of the depth of the borehole, using a further logging device, wherein the depth resolution of the further logging device is superior to that of the nuclear logging tool;
   (c) identifying from the further log data a plurality of boundaries between adjacent zones of the part of the depth that exhibit an attribute of the geological formation to a detectably contrasting degree;
   (d) generating from pre-acquired data describing one or more characteristics of the moveable nuclear logging tool a modeled log of the attributes over the said part of the depth;
   (e) calculating from the pre-acquired data a zone response in respect of each of the zones, using the boundaries to define an initial measure of the depth of each of the zones and ascribing a value of the attribute in dependence on the depth of each of the zones; and (f) calculating the attribute of each of the zones by deconvolving the nuclear log data using the zone response so as to minimize a difference between the nuclear log data and a convolution of the zone response and the corresponding calculated attribute.

2. The method according to claim 1, further comprising one or more steps selected from the group consisting of (g) transmitting, outputting, processing, printing, saving and/or displaying the inverted log.

3. The method according to claim 1, wherein the nuclear logging tool comprises a density logging tool, a gamma logging tool, or a neutron porosity logging tool, and wherein the nuclear log data corresponds to the tool type.

4. The method according to claim 1, wherein the further logging device comprises an image logging tool, and wherein the further log data comprises an image log of the part of the depth of the borehole.

5. The method according to claim 4, wherein the image logging tool comprises a micro-resistivity imaging tool.

6. The method according to claim 1, wherein the adjacent zones of the part of the depth of the borehole are or correspond to adjacent beds of the geological formation.

7. The method according to claim 1, wherein the attribute is selected from the group consisting of density, neutron porosity, and natural gamma radiation of the geological formation.

8. The method according to claim 1, wherein the step of calculating from the pre-acquired data the zone response comprises, in respect of each said zone, using the boundaries to define an initial measure of the depth of each zone and ascribing a value of the said attribute in dependence on the said depth of each zone to permit calculation of the zone response in accordance with an expression $$br_k = \sum_{m=sd-fl}^{ed+fl} W_k(m) * vrf(n-m)$$

in which:
 $br_k$ is the zone response;
 k is a zone number in a depth window;
 $W_k$ is a top hat function specific to the depth of the zone in question;
 vrf is a tool vertical response function;
 fl is a number of samples in the vertical response function;
 sd is a start depth within a depth window;
 ed is an end depth within a depth window;
 m=summation index; and
 n represents a formation depth in the window.

9. The method according to claim 1, wherein the one or more characteristics of the nuclear logging tool comprise one or more vertical response function characteristics.

10. The method according to claim 9, wherein the pre-acquired data comprises Monte Carlo N-Particle Transport Code (MCNP) modeled data acquired by the further steps of:
 before acquiring the nuclear log data, operating the nuclear logging tool or another logging tool having the same characteristics as the nuclear logging tool in a test environment having known attributes; and
 processing responses of the nuclear or other logging tool in accordance with an MCNP method.

11. The method according to claim 1, wherein the step of identifying from the further log data the plurality of boundaries between the adjacent zones of the part of the depth comprises the sub-steps of:

(c1) viewing the further log data via an electronic viewing device having an input device that is capable of selecting one or more parts of the log data for combination with the nuclear log data; and (c2) selecting one or more parts of the further log data corresponding to the boundaries using the input device.

12. The method according to claim 1, wherein the step of identifying from the further log data the plurality of boundaries between the adjacent zones of the part of the depth comprises the sub-step of (c3) operating software that is capable of identifying the boundaries in order to select one or more parts of the further log data corresponding to the boundaries.

13. The method according to claim 1, comprising the step of carrying out the steps of (a) acquiring the nuclear log data and (b) acquiring the further log data in a single logging pass along the part of the depth of the borehole.

14. The method according to claim 13, wherein the nuclear logging tool and the further logging device are secured to or are formed integrally with one another.

15. The method according to claim 1, wherein the steps are carried out in real-time relative to the acquisition of the nuclear log data and the further log data.

16. The method according to claim 1, when the steps are carried out as part of a logging while drilling (LWD) operation.

17. The method according to claim 1, further comprising the step of (k) using the inverted log to generate one or more command inputs to a geosteering apparatus for controlling direction of drilling of a controllable drilling tool.

18. An inverted log generated in accordance with a method of generating an inverted nuclear log pertaining to a geological formation surrounding a borehole, the method comprising the steps of:

(a) acquiring nuclear log data in respect of at least part of the depth of the borehole using a moveable nuclear logging tool;

(b) acquiring further log data, in respect of the said part of the depth of the borehole, using a further logging device, wherein the depth resolution of the further logging device is superior to that of the nuclear logging tool;

(c) identifying from the further log data a plurality of boundaries between adjacent zones of the part of the depth that exhibit an attribute of the geological formation to a detectably contrasting degree;

(d) generating from pre-acquired data describing one or more characteristics of the moveable nuclear logging tool a modeled loci of the attributes over the said part of the depth;

(e) calculating from the pre-acquired data a zone response in respect of each of the zones, using the boundaries to define an initial measure of the depth of each of the zones and ascribing a value of the attribute in dependence on the depth of each of the zones; and (f) calculating the attribute of each of the zones by deconvolving the nuclear log data using the zone response so as to minimize a difference between the nuclear loci data and a convolution of the zone response and the corresponding calculated attribute.

* * * * *